United States Patent
Andonian et al.

(10) Patent No.: US 9,902,379 B2
(45) Date of Patent: Feb. 27, 2018

(54) CONTROLLING WHEEL HOP IN A VEHICLE AXLE

(75) Inventors: Brian J. Andonian, Plymouth, MI (US); Jacob M. Povirk, Franklin, MI (US); David A. Robertson, Westland, MI (US); Jihong Guo, Ann Arbor, MI (US); Patrick Meloche, Northville, MI (US); Gary M. Pietrzyk, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 658 days.

(21) Appl. No.: 13/113,132

(22) Filed: May 23, 2011

(65) Prior Publication Data

US 2012/0303236 A1    Nov. 29, 2012

(51) Int. Cl.
*B60T 7/12*    (2006.01)
*B60T 8/175*   (2006.01)

(52) U.S. Cl.
CPC .......... *B60T 8/175* (2013.01); *B60T 2201/14* (2013.01)

(58) Field of Classification Search
CPC .......... G01M 17/022; G01M 1/225; B60G 2400/252; B60G 17/018; B60T 8/175; B60T 8/48; B60T 2210/12
USPC .......... 701/83, 54, 58, 90, 87; 475/231, 200
See application file for complete search history.

(56) References Cited

U.S. PATENT DOCUMENTS

| | | | | |
|---|---|---|---|---|
| 5,077,672 A | * | 12/1991 | Nobumoto | B60T 8/175 180/197 |
| 5,337,864 A | * | 8/1994 | Sjostrom | B60G 13/18 188/266.2 |
| 5,432,700 A | | 7/1995 | Hrovat et al. | |
| 5,519,617 A | * | 5/1996 | Hughes | B60K 28/16 180/197 |
| 6,147,600 A | * | 11/2000 | Faye | B60K 31/0008 340/463 |
| 6,272,412 B1 | * | 8/2001 | Wu | B60R 21/0132 701/45 |
| 6,401,853 B1 | | 6/2002 | Turski et al. | |
| 6,412,788 B1 | * | 7/2002 | Ichimaru | B60G 17/0165 280/5.515 |
| 6,952,637 B2 | * | 10/2005 | Barron | B60G 17/015 701/36 |
| 7,313,472 B2 | * | 12/2007 | Schick | F02D 41/021 477/121 |
| 7,425,187 B2 | * | 9/2008 | Doering | F02D 37/02 477/107 |
| 7,553,255 B2 | * | 6/2009 | Torres | B60K 17/20 180/249 |
| 7,966,115 B2 | * | 6/2011 | Bellinger | F16H 61/0213 700/900 |
| 8,210,987 B2 | * | 7/2012 | Hofler | B60W 10/16 477/35 |

(Continued)

*Primary Examiner* — Shardul D Patel
(74) *Attorney, Agent, or Firm* — James Dottavio; MacMillan, Sobanski & Todd, LLC (57) ABSTRACT

A method for controlling wheel hop at a vehicle axle includes determining that one of a difference between average front and rear wheel speeds exceeds a reference difference, a frequency of a signal produced by an accelerometer mounted on the axle exceeds a reference frequency, and a frequency of a lock ring torque exceeds a second reference frequency; pulsing pressure in the wheel brakes of the axle; and reducing engine torque.

16 Claims, 7 Drawing Sheets

(56) References Cited

U.S. PATENT DOCUMENTS

| | | | |
|---|---|---|---|
| 8,234,045 B2* | 7/2012 | Spadafora | B62D 5/003 340/507 |
| 8,376,380 B2* | 2/2013 | Smith | B60G 11/10 267/260 |
| 8,600,594 B2* | 12/2013 | Aoki | B60K 6/445 180/65.1 |
| 2004/0260046 A1* | 12/2004 | Smith | C08F 110/02 526/352 |
| 2004/0260446 A1* | 12/2004 | Hamada et al. | 701/70 |
| 2006/0080023 A1* | 4/2006 | Hrovat | B60K 28/16 701/82 |
| 2008/0243334 A1 | 10/2008 | Bujak et al. | |
| 2009/0107747 A1* | 4/2009 | Luehrsen | B60T 8/175 180/197 |
| 2009/0317266 A1* | 12/2009 | Rampen | F03C 1/0447 417/53 |

* cited by examiner

CONTROLLING WHEEL HOP IN A VEHICLE AXLE

BACKGROUND OF THE INVENTION

1. Field of the Invention

This invention relates generally to a vehicle driveline, and particularity to using engine and brake control to prevent damage to structural components during wheel hop conditions.

2. Description of the Prior Art

During certain vehicle maneuvers, which involve a particular combination of rear wheel speed, rear wheel torque, tire and road surface conditions, and suspension parameters, the rear solid beam axle can resonate causing a situation known as wheel hop.

Because of the high torques generated at each axle shaft and the high frequency of the loading, the wheel hop condition can be particularly damaging to rear axle components, especially if the axle differential is locked, and the vehicle is turning causing a torque bias across the locked differential.

SUMMARY OF THE INVENTION

A method for controlling wheel hop at a vehicle axle includes pulsing pressure in the wheel brakes of the axle, if one of a difference between average front and rear wheel speeds exceeds a reference difference, a frequency of a signal produced by an accelerometer mounted on the axle exceeds a reference frequency, and a frequency of a lock ring torque exceeds a second reference frequency; and reducing engine torque.

Rear wheel speeds from anti-lock brake system (ABS) sensors can be used to determine wheel rotational velocities. Additional vehicle sensor signals such as front wheel speeds, accelerator pedal position, brake on/off, steering wheel angle and vehicle speed are also used. These signals are used to detect the wheel hop condition and a potential damaging condition to the axle locking mechanism. Once wheel hop is detected, engine control parameters and ABS brake pressure are adjusted to mitigate or eliminate wheel hop.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
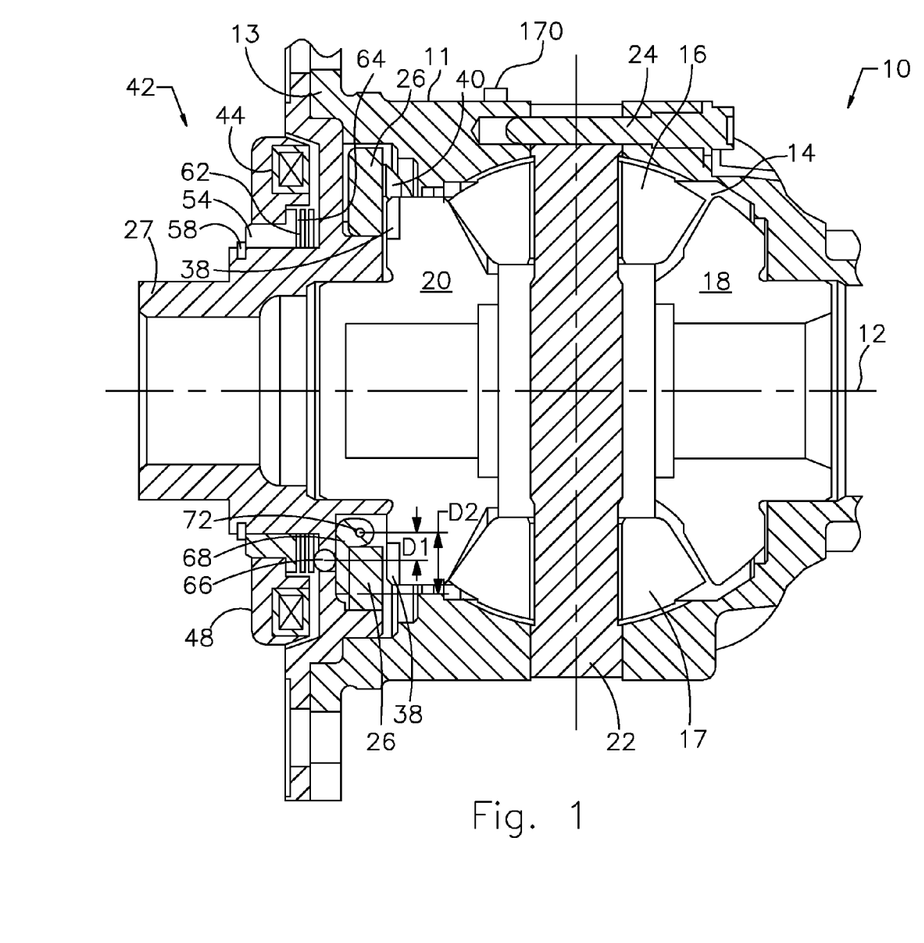
FIG. 1 is a cross section taken at a diametric plane through a locking differential mechanism.

FIG. 1 shows a differential mechanism 10, which includes a differential case 11, preferably of cast iron or steel, supported on a stationary housing (not shown) for rotation about a lateral axis 12. The case 11 is driveably connected through a bevel ring gear (not shown) to the output of a transmission or transfer case. The ring gear, secured to the case 11 at the attachment bolt holes on a flange 13, is supported for rotation about axis 12.

The case 11 encloses an internal chamber 14, which contains bevel pinions 16, 17. Chamber 14 contains a right-side bevel gear 18 meshing with the pinions 16, 17, driveably connected to an output shaft, which is secured by a spline to side gear 18 and extends laterally at the right-hand side from the case 11 to a driven wheel of a motor vehicle. Chamber 14 contains a left-side bevel gear 20 meshing with the pinions 16, 17, driveably connected to a second output shaft, which is secured by a spline to side gear 20 and extends laterally from the case 11 at the left-hand side to a driven wheel of the motor vehicle. A spindle 22, is secured by a pin 24 to the rotating case 11, supports the pinions 16, 17 for rotation about the axis of spindle 22 substantially perpendicular to axis 12. The pinions 16, 17 and spindle 22 rotate about axis 12.

Also located in case 11 is a lock ring 26, which rotates with the case 11 about axis 12 due to contact with a differential case end cap 27. Case 11 is secured to the end cap 27 at attachment holes aligned with those on case flange 13. Rotation of the lock ring 26 relative to the case 11 and end cap 27 is prevented. The axial inner or inboard surface of lock ring 26 is formed with a series of angularly spaced clutch recesses, which are adjacent and face the axial outer or outboard surface of the side gear 20.

The axial outer surface of side gear 20 is formed with a series of clutch teeth 38 angularly spaced about axis 12, facing and adjacent the clutch recesses of the lock ring 26. The clutch teeth 38 of side gear 20 and the clutch recesses of lock ring 26 are mutually complementary such that they can engage and disengage as the lock ring moves toward and away from the side gear 20.

A coil assembly 42 is supported on the case 11 outside chamber 14. The coil assembly 42 includes an electromagnetic coil 44, fitted into an annular recess formed in a ring 48, and a non-magnetic collar 54 press fitted into ring 48. The coil 44 produces a magnetic field when energized with electric current. The magnetic field produces an axial force on the coil assembly 42, whose magnitude varies with the width of an air gap between the coil assembly and the end cap 27.

The lock ring 26 is normally disengaged from the side gear 20, permitting the side gear to rotate with respect to the differential case 11 and the lock ring and producing an unlocked or disengaged state. When the coil 44 is energized with electric current it moves along axis 12 toward the case 11, actuating lock ring 26 to engage the side gear 20, and causing the clutch teeth 38 and recesses to engage mutually.

This movement rotatably connects the side gear to the lock ring and case 11, preventing the side gear from rotating relative to the case and lock ring, and placing differential 10 in a locked or engaged state. When coil 44 is deenergized, the compression force of an annular Belleville spring 40, located between the case 11 and lock ring 26, forces the lock ring axially away from the side gear 20, thereby returning the differential 10 to the unlocked or disengaged state.

In operation when the coil 44 is energized, it is attracted to the differential end cap 27 due to the magnetic field generated by the coil. The coil assembly 42 is fixed against rotation with respect to the differential case 11, but it can translate axially toward and away from the differential case. Axial displacement of the coil assembly 42 is transmitted to collar 54, which is secured to the end cap 27 by a snap ring 58. Collar 54 allows rotation of the differential 10 with respect to the assembly 42 and provides a linear guide for the coil assembly 42 to translate axially.

When coil 44 is energized, the sliding collar 54 applies an axial force directed rightward to a roller thrust bearing 62 and thrust plate or thrust washer 64. Bearing 62 and thrust plate 64 are located in an annular recess formed in the end cap 27. When coil 44 is energized, thrust plate 64 applies axial force to three angularly spaced balls 66, each ball retained in a hole formed in the end cap 27. Three angularly spaced levers 68 are pinned to lugs formed on the end cap 27, each lever located at the angular position of a ball 66.

The mechanism comprising the balls 66 and lever 68 is located axially between the lock ring 26 and the case 11. The levers 68 are actuated by the energized coil assembly 42 moving axially toward case 11 forcing thrust plate 64 against the balls 66, causing the levers 68 to pivot about pivot axes 72. The outboard end of each lever 68 contacts lock ring 26 as the lever pivots, thereby moving the lock ring clutch recesses into engagement with clutch teeth 38 of the side gear 20. The lock ring 26 moves into mechanical engagement with the side gear 20 to prevent rotation of the side gear relative to the case 11.

Each ball 66 is located at a distance D1 from the lever's pivot axis 72. The lock ring 26 is moved due to contact with the end of the levers 68, which end is located at a distance D2 from the lever rotation axis 72. Axial displacement of the coil assembly 42 due to energizing coil 44 is amplified at the locking ring 28 by the ratio D2/D1. For example, with an initial coil air gap of 1.0 mm and a final air gap of 0.5 mm, when the differential 10 is fully locked, the coil 44 moves through a distance of 0.5 mm. Using a ball and lever D2/D1 ratio of 2.3, the lock ring moves through a distance of 1.15 mm.

When side gear 20 is fixed to case 11, the differential is locked such that both side gears 18, 20 and the left-hand and right-hand wheels connected by axle shafts to the side gears rotate at the same speed, instead of at differential speeds.

Figure 2:
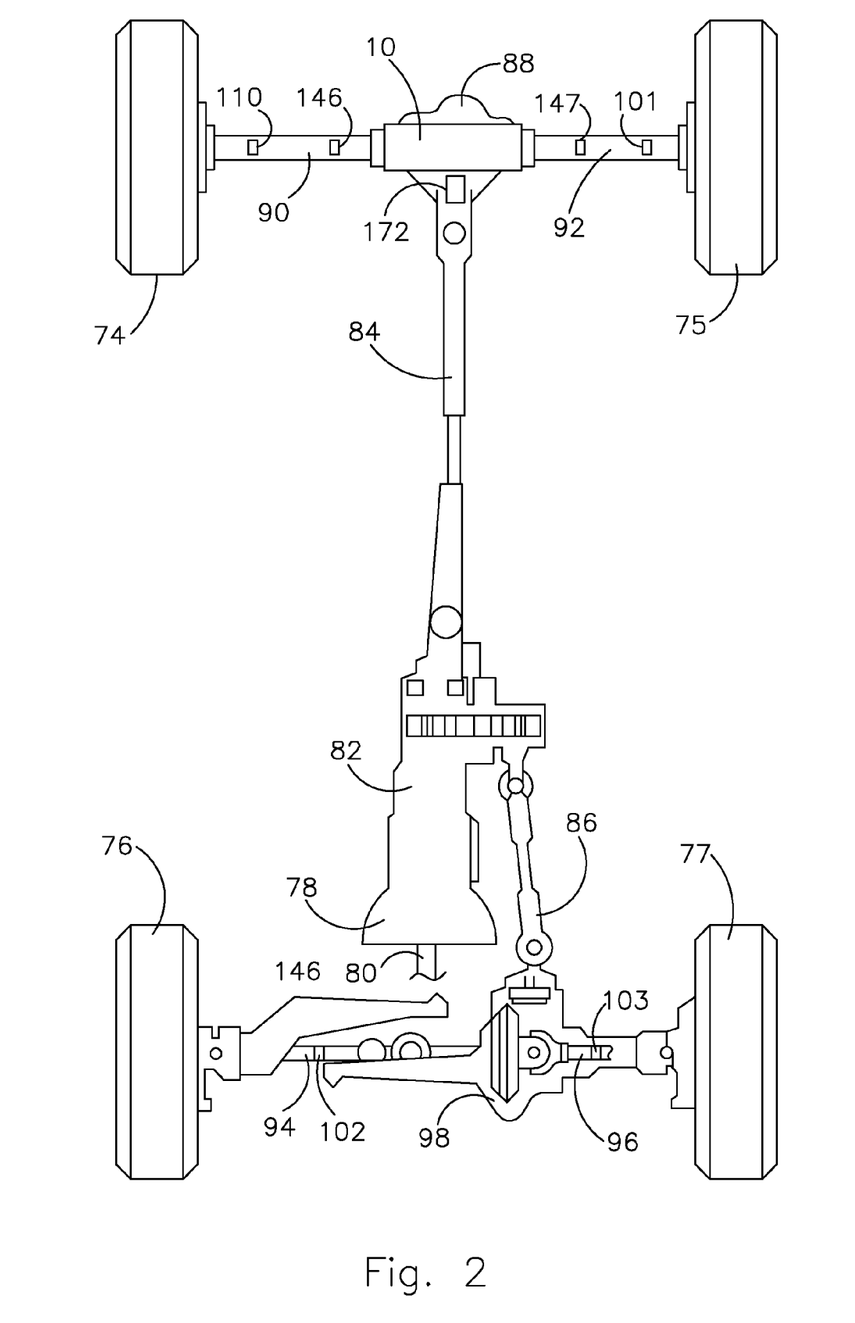
FIG. 2 is a plan view of a motor vehicle driveline that includes a transmission, transfer case, front and rear drive shafts, and shafts extending to front wheels and rear wheels.

The motor vehicle the powertrain of FIG. 2 includes right and left rear wheels 74, 75, right and left front wheels 76, 77, a power transmission 78 for producing multiple forward and reverse speed ratios driven by an engine crankshaft 80, and a transfer case 82 for continuously driveably connecting the transmission output to a rear drive shaft 84. The transfer case 82 selectively connects the transmission output to both the front drive shaft 86 and rear drive shaft 84 when a four-wheel drive mode of operation is selected, either manually or electronically. Shaft 84 transmits power to the rear locking differential mechanism 10 contained within a differential housing 88. The differential 10 transmits power to the rear wheels 74, 75 through axle shafts 90, 92.

The front wheels are driveably connected to right-hand and left-hand halfshafts 94, 96, to which power is transmitted from the front drive shaft 86 through a front differential mechanism 98.

The transfer case assembly 16 continually transmits rotating power to the rear driveshaft 84 and rear wheels 74, 75, which is the primary power path. The transfer case 16 intermittently transmits rotating power to the front driveshaft 86 and the front wheels 76, 77, which is the secondary power path, when a clutch located in the transfer case is actuated. Alternatively a switch or lever is activated for transfer cases that have mechanically locked outputs for transmitting torque at a fixed ratio to the front and rear driveshafts.

Figure 3:
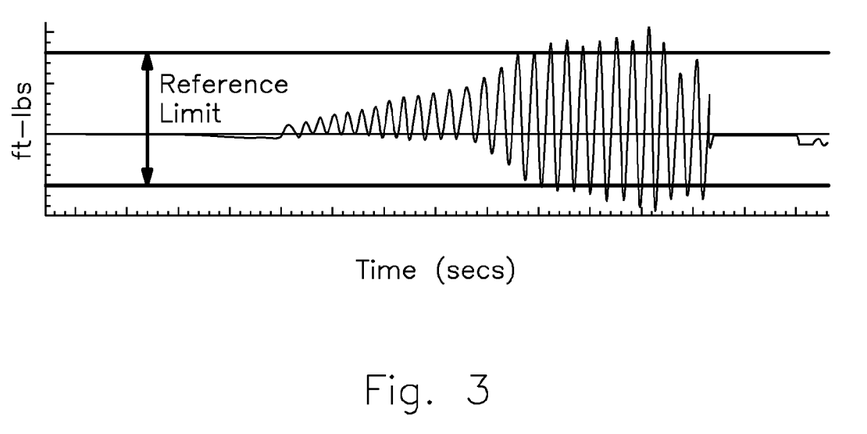
FIG. 3 is a graph showing the variation of lock ring torque during a wheel hop condition with a locked rear axle.

FIG. 3 shows the variation of axle lock ring 26 torque during a wheel hop condition with differential 10 locked. When the vehicle's rear axles 90, 92 are locked, the bias torque across the differential is reacted at the locking mechanism. FIG. 3 shows the calculated value of the bias torque. i.e., left side torque minus right side torque. It can be seen that the torque on the locking mechanism or lock ring 26 exceeds a reference limit This occurs when torques carried by the two rear axle shafts 90, 92 are out of phase, as occurs when the vehicle is turning.

A signal representing the rotary speed of the rear wheels 74, 75 produced by anti-lock brake system (ABS) sensors can be used to determine wheel rotational velocities. Additional vehicle sensor signals such as front wheel speeds, accelerator pedal position, brake on/off, steering wheel angle and vehicle speed are also available. These signals are used to detect the wheel hop condition and a potential damaging condition to the axle locking mechanism. Once wheel hop is detected, engine control parameters and ABS brake pressure can be adjusted to mitigate or eliminate wheel hop.

Several vehicle sensors are used to detect a wheel hop condition while differential mechanism 10 is locked, thereby driving the rear wheels 74, 75 at the same speed by fully engaging the lock ring 26 to the side gear 20 in the differential. The electronic locking differential 10 (ELD) actuates the locking clutch electrically to lock the differential. But the differential locking mechanism may be actuated hydraulically or pneumatically. The differential used with this control does not include a steering differential.

The ON/OFF state of the differential locking mechanism can be determined from the signals produced by speed sensors 100, 101 on the rear axles 90, 92. In the wheel hop control algorithm 118 of FIG. 4, a test is performed at step 120 to determine whether the differential locking mechanism is ON. If the differential locking mechanism is OFF, the control algorithm 118 executes step 122, in which wheel hop control is terminated.

Figure 4:
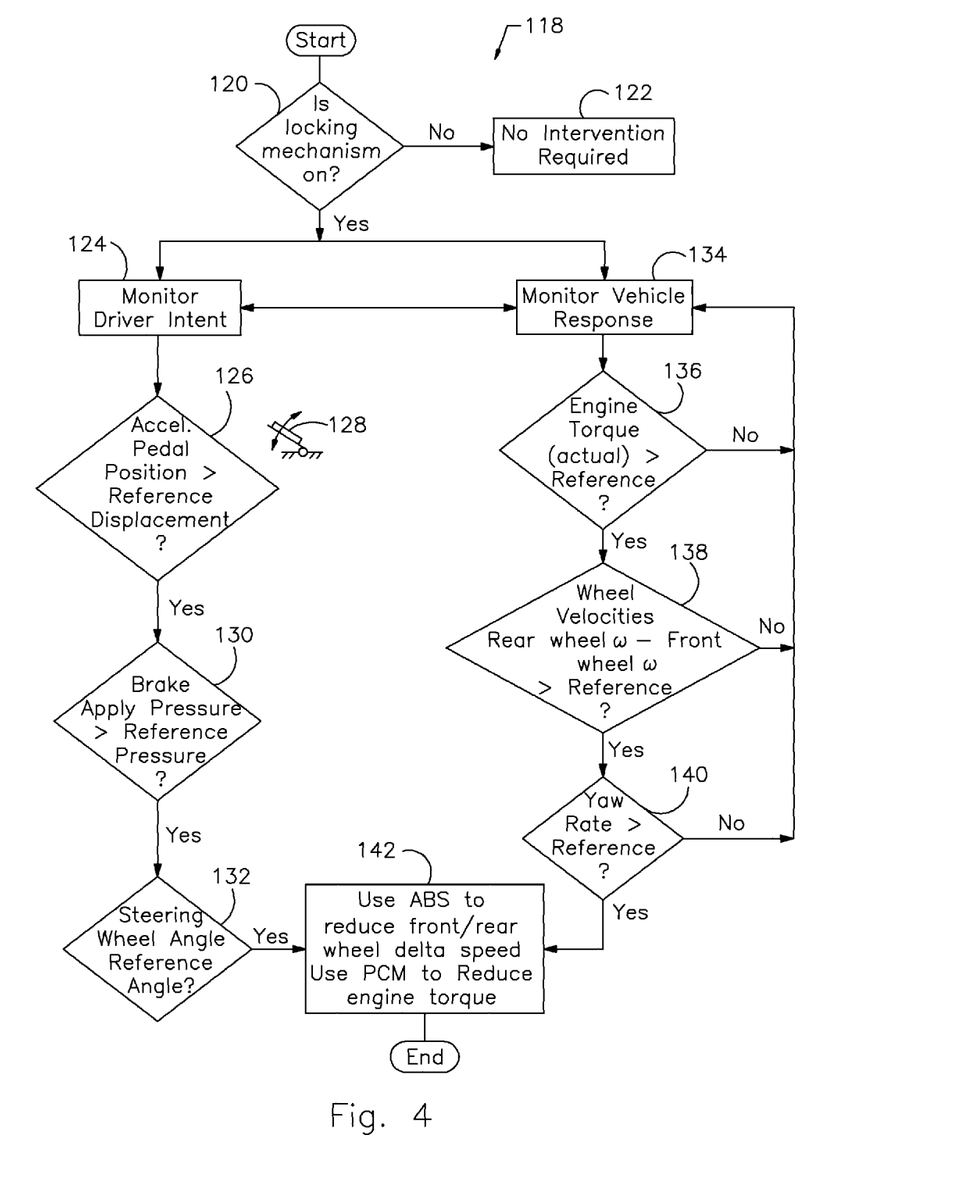
FIG. 4 is diagram showing the steps of a wheel hop prevention control algorithm.
Figure 5:
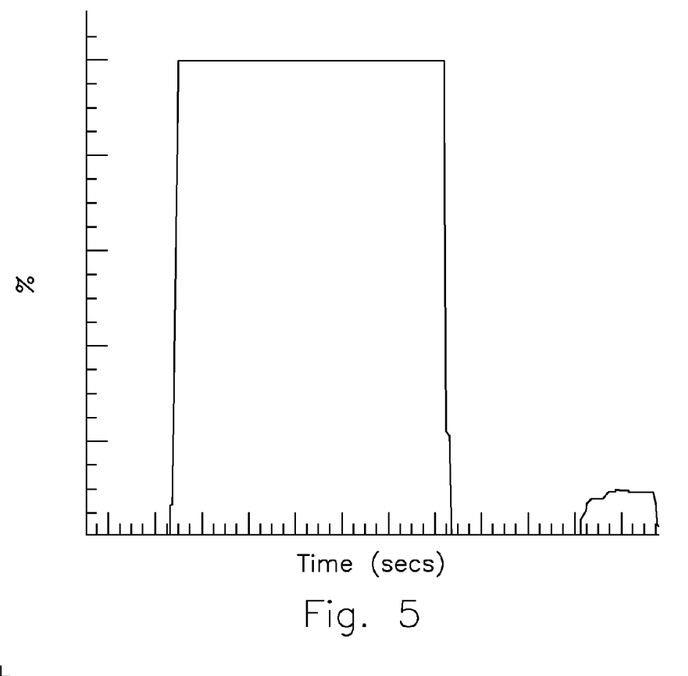
FIG. 5 is a graph showing the variation of accelerator pedal position with time during a wheel hop condition.

The algorithm monitors the vehicle operator's intent 124. At step 126 a test is performed to determine whether the displacement of the vehicle's accelerator pedal 128 is greater than a reference displacement or a reference portion of its maximum possible displacement. FIG. 5 illustrates full accelerator pedal displacement. Note that the reference accelerator pedal displacement may be set to 100% or any other throttle angle.

Steps 130 and 132 are performed on an and/or basis. At step 130 a test is performed to determine whether wheel brake apply pressure is greater than a reference pressure.

Figure 6:
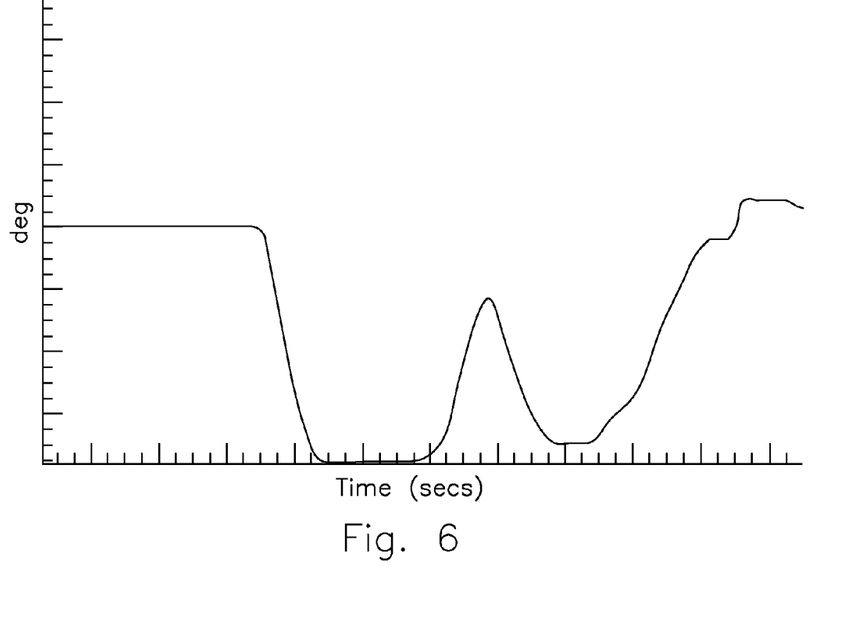
FIG. 6 is a graph showing the variation of steering wheel angle with time during a wheel hop condition.

At step 132 a test is performed to determine whether the angular displacement of the steering wheel is greater than a reference angular displacement. FIG. 6 illustrates the variation over time of steering wheel angle.

If wheel hop control algorithm 118 determines that conditions are present for a potential out of phase wheel hop event, ABS and engine control are used to prevent the event.

Concurrently with monitoring driver intent 124, the wheel hop control algorithm 118 monitors vehicle response 134. At step 136 a test is performed to determine whether actual engine torque is greater than a reference engine torque.

At step 138 a test is performed to determine the current speed of the front and rear right-hand side wheels and the left-hand side wheels using signal produced by speed sensors 100-103. From these measurements the average front wheel speed ($\omega f$) and average rear wheel speed (car) are determined. The algorithm 118 determines whether $\omega r-\omega f$ is greater than a predetermined reference speed difference.

At step 140 a test is performed to determine whether the vehicle yaw rate is greater than a reference yaw rate.

If the accelerator position exceeds the reference position at test 126, and the difference between the average speed of the rear wheels 74, 75 and the average speed of the front wheels 76, 77 exceeds the reference speed difference at test 138, at step 142 algorithm 118 indicates that wheel hop intervention is required. The algorithm 118 produces an output signal, to which preferably the ABS responds by pulsing pressure in the brakes of the rear wheels 74, 75. The algorithm 118 produces another output signal to which the powertrain control module (PCM) responds by reducing engine torque. These actions reduce the speed difference between the rear and front wheels, and reduce or eliminate the wheel hop condition, whereupon execution of the algorithm terminates.

Figure 7:
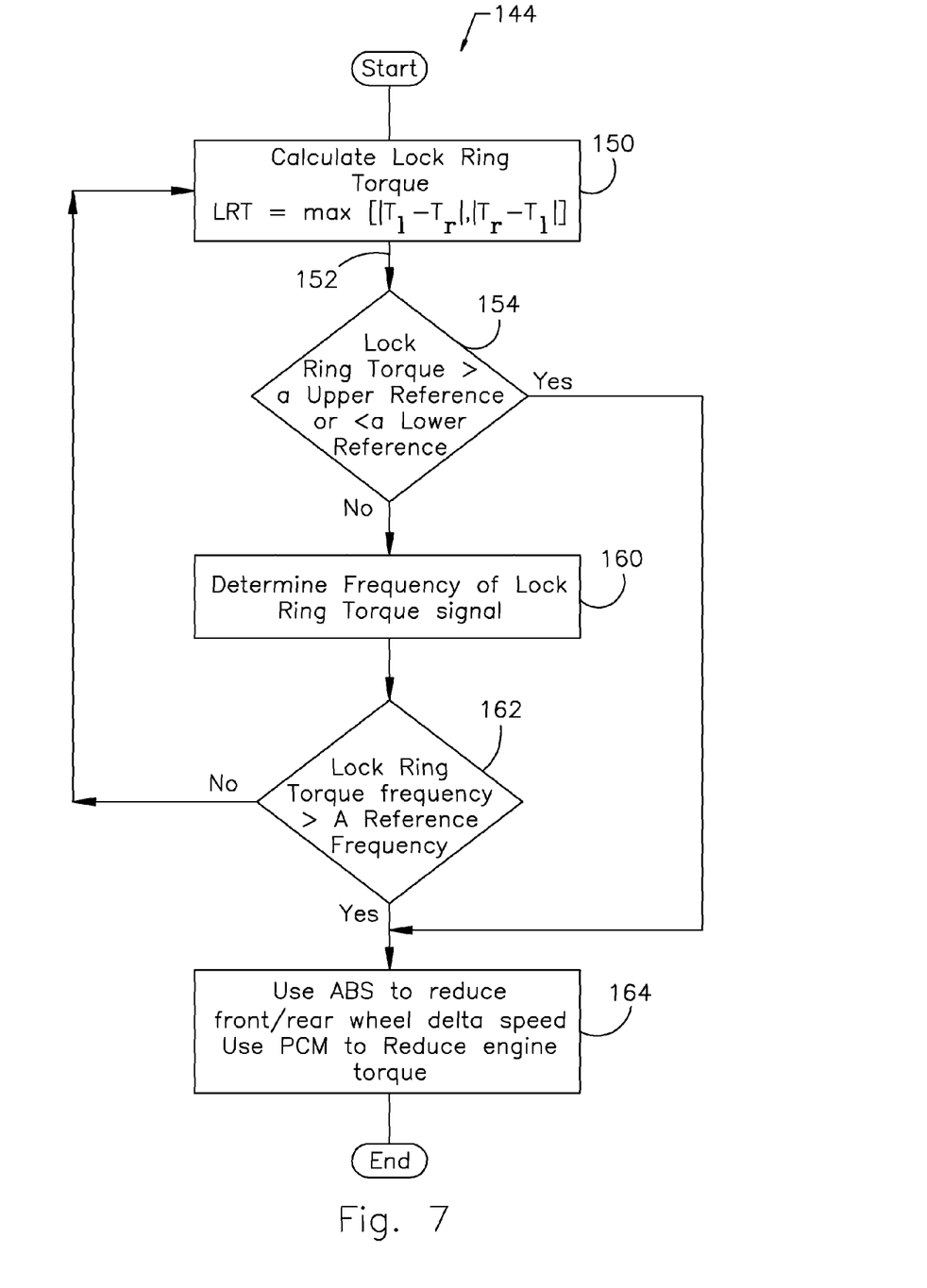
FIG. 7 is diagram showing the steps of a wheel hop prevention control algorithm.

In the related wheel hop control algorithm 144 of FIG. 7, right-hand and left-hand rear axle shaft torques are measured directly using torque sensors 146, 147.

At step 150, a signal 152 is produced representing lock ring torque (LRT =max [$|T_l-T_r|,|T_r-T_l|$]), wherein $|T_l-T_r|$ is the absolute difference between torque at the left-hand wheel 75 minus torque at the right-hand wheel 74; and $|T_r-T_l|$ is the absolute difference between torque at the right-hand wheel 74 minus torque at the left-hand wheel 75.

The wheels for which LRT is calculated at step 150 are the wheels that are aligned with and receive torque directly transmitted from the electronic locking differential mechanism 10.

FIG. 6 illustrates the LRT signal 152 and its upper and lower reference torques 155, 156. At step 154 a test is performed to determine if LRT exceeds the upper reference lock ring torque 155 or the lower reference lock ring torque 156.

If the result of test 154 is logically false, control advances to step 164. But if the result of test 154 is true, at step 160 the frequency of the LRT signal 152 is determined.

At step 162 at test is performed to determine whether the frequency of the LRT signal 152 is exceeds a reference frequency and LRT is greater than a second reference torque.

If the result of either test 162 or test 154 is true, at step 164 the algorithm intervenes to reduce or eliminate the wheel hop condition. At step 164 the algorithm produces an output signal, to which the ABS responds by pulsing pressure in the brakes of the rear wheels 74, 75. The algorithm also produces another output signal to which the powertrain control module (PCM) responds by adjusting engine control parameters, such as spark timing or air/fuel mixture, to reduced engine output torque. These actions reduce the speed difference between the rear and front wheels, reduce LRT, reduce the frequency of the LRT, and reduce or eliminate the wheel hop condition, whereupon execution of the algorithm terminates.

Preferably the lock ring torque reference of step 162 is less than the lock ring torque reference of step 154 because torque application at a higher frequency is more damaging than steady state or low frequency torque application.

Figure 8:
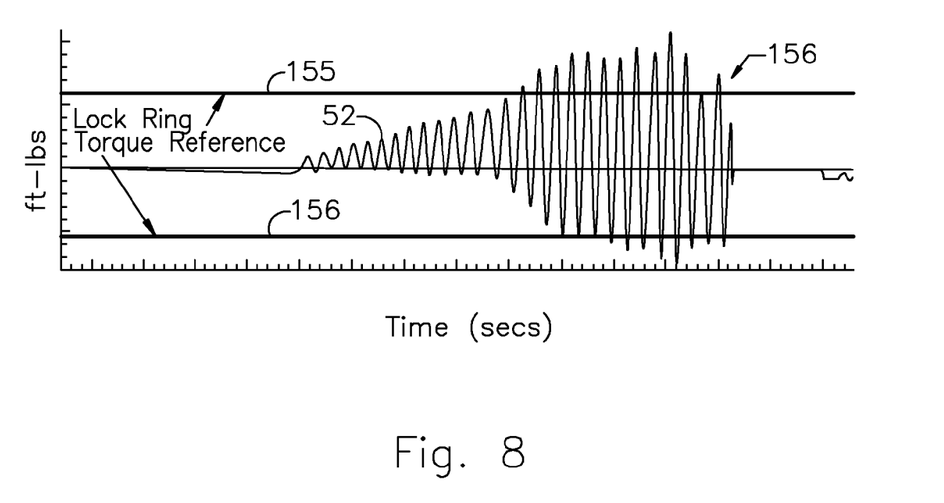
FIG. 8 is a graph showing a trace of lock ring torque during a wheel hop condition.

A wheel hop condition that is subject to reduction or elimination can occur whether the differential of the subject axle is unlocked or locked. FIG. 1 shows an accelerometer 170 secured to the differential housing 88. FIG. 2 shows an accelerometer 172 secured to the differential case 11. The amplitude and frequency of vibrations produced during a wheel hop condition are represented by a signal produced by at least one of accelerometers 170, 172, as shown in FIG. 8. The frequency of a signal produced by the accelerometer 170, 172 is determined. Then a test is performed to determine whether the frequency of the signal produced by the accelerometer 170, 172 exceeds a reference frequency. If the frequency of the signal produced by the accelerometer 170, 172 exceeds the reference frequency, the algorithm intervenes to reduce or eliminate the wheel hop condition, although the differential is unlocked. At step 164 the algorithm produces an output signal, to which the ABS responds by pulsing pressure in the brakes of the rear wheels 74, 75 or the wheels of the axle where the wheel hop condition occurs. The algorithm also produces another output signal to which the powertrain control module (PCM) responds by adjusting engine control parameters, such as spark timing or air/fuel mixture, to reduced engine output torque. These actions reduce or eliminate the wheel hop condition, whereupon execution of the algorithm terminates.

In accordance with the provisions of the patent statutes, the preferred embodiment has been described. However, it should be noted that the alternate embodiments can be practiced otherwise than as specifically illustrated and described.

The invention claimed is:

1. A method for controlling wheel hop at a vehicle axle, comprising:
reducing engine torque and pulsing pressure in wheel brakes of the axle, if one of a difference between average front and rear wheel speeds exceeds a reference difference, a frequency of a signal produced by an accelerometer mounted on a differential exceeds a reference frequency, or a frequency and magnitude of a lock ring torque exceeds a second reference frequency and magnitude.

2. The method of claim 1, wherein the step is executed, if an accelerator pedal position exceeds a reference position.

3. The method of claim 1, wherein the step is executed if lock ring torque determined from (LRT=max [$|T_l-T_r|,|T_r-T_l|$]), wherein $|T_l-T_r|$ is the absolute difference between torque at a left-hand wheel at the axle minus torque at a right-hand wheel of the axle, and $|T_r-T_l|$ is an absolute difference between torque at said right-hand wheel minus torque at said left-hand wheel.

4. The method of claim 1, wherein the step is executed if either an upper amplitude of lock ring torque exceeds an upper reference or a lower amplitude of lock ring torque is less than a lower reference.

5. The method of claim 1, wherein reducing engine torque further comprises using one of spark timing and air fuel mixture to reduce engine torque.

6. The method of claim 1, wherein pulsing pressure in the wheel brakes of the axle further comprises using an antilock brake system to pulse pressure in the wheel brakes of the axle.

7. A method for controlling wheel hop at a vehicle axle, comprising:
pulsing pressure in wheel brakes of the axle and reducing engine torque if an accelerator pedal position exceeds a reference position
and a difference between an average front wheel speed and an average rear wheel speed exceeds a reference speed difference.

8. The method of claim 7, further comprising pulsing pressure in the wheel brakes of the axle and reducing the engine torque if the accelerator pedal position exceeds the reference position, the difference between the average front wheel speed and the average rear wheel speed exceeds the reference speed difference and a differential for transmitting power to the wheels of the axle is locked.

9. The method of claim 7, further comprising pulsing pressure in the wheel brakes of the axle and reducing the engine torque if the accelerator pedal position exceeds the reference position, the difference between the average front wheel speed and the average rear wheel speed exceeds the reference speed difference and pressure applied to the wheel brakes of the axle is greater than a reference pressure.

10. The method of claim 7, further comprising pulsing pressure in the wheel brakes of the axle and reducing the engine torque if the accelerator pedal position exceeds the reference position, the difference between the average front wheel speed and the average rear wheel speed exceeds the reference speed difference and an angular displacement of a steering wheel of the vehicle is greater than a reference angular displacement.

11. The method of claim 7, further comprising pulsing pressure in the wheel brakes of the axle and reducing the engine torque if the accelerator pedal position exceeds the reference position, the difference between the average front wheel speed and the average rear wheel speed exceeds the reference speed difference and a torque produce by an engine of the vehicle is greater than a reference torque.

12. The method of claim 7, further comprising pulsing pressure in the wheel brakes of the axle and reducing the engine torque if the accelerator pedal position exceeds the reference position, the difference between the average front wheel speed and the average rear wheel speed exceeds the reference speed difference and a yaw rate of the vehicle is greater than a reference yaw rate.

13. A method for controlling wheel hop at a vehicle axle, comprising:
reducing engine torque and pulsing pressure in wheel brakes of the axle, if accelerator pedal position exceeds a reference position and a frequency of a signal produced by an accelerometer mounted on a differential exceeds a reference frequency.

14. The method of claim 13, wherein reducing the engine torque further comprises using one of spark timing and air fuel mixture to reduce engine torque.

15. The method of claim 13, wherein pulsing pressure in the wheel brakes of the axle further comprises using an antilock brake system to pulse pressure in the wheel brakes of the axle.

16. A method for controlling wheel hop at a vehicle axle, comprising:
(a) reducing engine torque and pulsing pressure in wheel brakes of the axle, if one of a difference between average front and rear wheel speeds exceeds a reference difference, a frequency of a signal produced by an accelerometer mounted to measure acceleration of the axle exceeds a reference frequency, or a frequency and magnitude of a lock ring torque exceeds a second reference frequency and magnitude;
(b) executing step (a) provided lock ring torque is equal to max $[|T_l-T_r|,|T_r-T_l|]$, wherein $|T_l-T_r|$ is the absolute difference between torque at a left-hand wheel at the axle minus torque at a right-hand wheel of the axle, and $|T_r-T_l|$ is an absolute difference between torque at said right-hand wheel minus torque at said left-hand wheel.

* * * * *